(12) United States Patent
Yang

(10) Patent No.: US 9,282,422 B2
(45) Date of Patent: Mar. 8, 2016

(54) METHOD AND SYSTEM FOR PARAMETER CONFIGURATION OF MOBILE TERMINAL

(75) Inventor: Kun Yang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 0 days.

(21) Appl. No.: 14/399,329

(22) PCT Filed: Jul. 30, 2012

(86) PCT No.: PCT/CN2012/079378
§ 371 (c)(1),
(2), (4) Date: Nov. 6, 2014

(87) PCT Pub. No.: WO2013/166787
PCT Pub. Date: Nov. 14, 2013

(65) Prior Publication Data
US 2015/0119018 A1    Apr. 30, 2015

(30) Foreign Application Priority Data
May 8, 2012    (CN) .......................... 2012 1 0140114

(51) Int. Cl.
*H04M 3/00* (2006.01)
*H04W 4/00* (2009.01)
(Continued)

(52) U.S. Cl.
CPC ................ *H04W 4/001* (2013.01); *H04W 8/20* (2013.01); *H04W 48/16* (2013.01)

(58) Field of Classification Search
CPC . H04W 8/245; H04W 64/00; H04M 1/72525; H04L 9/08
USPC ........................ 455/418, 419, 456.6; 713/250
See application file for complete search history.

(56) References Cited

U.S. PATENT DOCUMENTS

| 8,630,192 B2* | 1/2014 | Raleigh ............ G06Q 10/06375 370/252 |
| 2006/0039561 A1 | 2/2006 | Ypya |

(Continued)

FOREIGN PATENT DOCUMENTS

| CN | 1780225 A | 5/2006 |
| CN | 1780474 A | 5/2006 |

(Continued)

OTHER PUBLICATIONS

International Search Report in international application No. PCT/CN2012/079378, mailed on Feb. 14, 2013.

(Continued)

*Primary Examiner* — Danh Le
(74) *Attorney, Agent, or Firm* — Oppedahl Patent Law Firm LLC

(57) ABSTRACT

Disclosed are a method and system for parameter configuration of a mobile terminal. The method includes that a mobile terminal sends a trigger message for requesting configuration to a unified configuration server; the unified configuration server parses the trigger message to obtain information of an operator in an environment where the mobile terminal currently is, and sends the information of the operator to an operator database server; the operator database server configures, according to the information of the operator, configuration information currently required by the mobile terminal, and sends the configuration information to the mobile terminal; the mobile terminal receives and parses the configuration information, and performs corresponding configuration on the mobile terminal according to the configuration information. By the method of the disclosure, when a mobile terminal is in a region where some functions are not available, the mobile terminal actively requests a server to configure and modify client parameters, so as to achieve the beneficial effect that service software can always be used normally no matter which environment the mobile terminal locates, thereby improving the user experience and normal life of users in the region.

10 Claims, 5 Drawing Sheets

(51) Int. Cl.
*H04W 8/20* (2009.01)
*H04W 48/16* (2009.01)

(56) References Cited

U.S. PATENT DOCUMENTS

| | | | |
|---|---|---|---|
| 2006/0166646 A1* | 7/2006 | Roach, Jr. | H04L 63/0407 455/411 |
| 2007/0169093 A1 | 7/2007 | Logan | |
| 2009/0318123 A1 | 12/2009 | Normark | |
| 2010/0248640 A1* | 9/2010 | MacNaughtan | H04W 4/02 455/67.11 |
| 2010/0286997 A1* | 11/2010 | Srinivasan | G06Q 50/22 705/2 |
| 2011/0219226 A1* | 9/2011 | Olsson | G06F 21/6245 713/150 |
| 2012/0003983 A1 | 1/2012 | Sherlock | |
| 2012/0047245 A1 | 2/2012 | Zhou | |
| 2013/0035078 A1* | 2/2013 | Skog | G06Q 30/02 455/414.1 |

FOREIGN PATENT DOCUMENTS

| | | |
|---|---|---|
| CN | 1867147 A | 11/2006 |
| CN | 101087460 A | 12/2007 |
| CN | 101883355 A | 11/2010 |
| CN | 102291493 A | 12/2011 |
| EP | 2227047 A1 | 9/2010 |
| WO | 2006018707 A1 | 2/2006 |
| WO | 2007073278 A2 | 6/2007 |

OTHER PUBLICATIONS

English Translation of the Written Opinion of the International Search Authority in international application No. PCT/CN2012/079378, mailed on Feb. 14, 2013.

Supplementary European Search Report in European application No. 12876340.6, mailed on May 18, 2015.

Rich Communication Suite 5.0 Advanced Communications Services and Client Specification, Apr. 19, 2012.

* cited by examiner

METHOD AND SYSTEM FOR PARAMETER CONFIGURATION OF MOBILE TERMINAL

TECHNICAL FIELD

The disclosure relates to the technical field of mobile networks, and particularly to a method and system for parameter configuration of a mobile terminal.

BACKGROUND

Generally, some applications such as Multimedia Messaging Service (MMS), and network settings such as access points etc. are preset when the production of a mobile device (including but not limited to mobile phones) is completed in a factory, so that the mobile device has the capability of working normally within the range of the sales market when leaving the factory. When the mobile device enters some unavailable regions, parameters of the mobile device are configured generally using an air interface configuration protocol, such as Open Mobile Alliance Client Provisioning (OMA CP), so that the mobile device can be used normally in the field.

OMA CP is a unidirectional configuration protocol, and an OMA CP parameter configuration message is required to be sent by a server to configure parameters of a mobile terminal. Therefore, when parameters of a terminal device are configured using an air interface configuration protocol like OMA CP, and if some functions of the mobile device are not supported in a region where the terminal device locates and transmission of such a parameter configuration message or command is not supported by a server in this region, then some functions of the mobile device will be unavailable in this region. If the mobile terminal switches frequently among different countries or regions and a server in the current country or region cannot modify parameters of the mobile terminal actively, then some software of the mobile terminal will be unavailable, such as an MMS home page access point, and a General Packet Radio Service (GPRS) network connection access point etc. At the same time, since related access information is different in different regions, the MMS application and data services are caused to be unavailable, which directly affects the use of functions of the mobile device by a user, thus greatly reducing user experience and affecting the daily life of the user.

Some software information of a mobile terminal can be modified and configured through OMA CP in a specific region or country in the prior art. When a mobile terminal is located in a specific region or country, a local server sends a configuration message to the mobile terminal of a user, and configures and modifies information of the mobile terminal of the user. Currently, the mainstream OMA CP solution is specifically as follows: when a terminal moves a to specific network and is found by an operator network, the operator network triggers a server to transmit configuration information, the terminal accepts information configuration and connects back to the server to complete configuration. The prior art has the following disadvantages: if a current operator is unable to initiate an OMA CP message process, some software of a mobile terminal of a user will be unavailable, e.g. if information of a German operator or a French operator is stored in MMS homepage access information and/or GPRS link access parameter information of the mobile terminal, when a user roams to China or Japan, the user will fail to use related data services like MMS and GPRS if the capability of OMA CP configuration is not provided in the area of a local operator in China or Japan.

SUMMARY

The embodiments of the disclosure provide a method and system for parameter configuration of a mobile terminal so that a mobile terminal actively requests a server to configure and modify client parameters when the mobile terminal is in a region where some functions are not available, so as to avoid the situation that some user functions cannot be used in an unavailable region, thereby improving the user experience and normal life of users in the region.

The disclosure provides a method for parameter configuration of a mobile terminal, including that:

a mobile terminal sends a trigger message for requesting configuration to a unified configuration server;

the unified configuration server parses the trigger message to obtain information of an operator in an environment where the mobile terminal currently is, and sends the information of the operator to an operator database server;

the operator database server configures, according to the information of the operator, configuration information currently required by the mobile terminal, and sends the configuration information to the mobile terminal;

the mobile terminal receives and parses the configuration information, and performs corresponding configuration on the mobile terminal according to the configuration information.

Preferably, before the mobile terminal sends the trigger message for requesting configuration to the unified configuration server, the method further includes that:

the mobile terminal finds a new registered network through search, and determines whether the new registered network is consistent with a network value stored by the mobile terminal, and if not consistent, the mobile terminal sends the trigger message for requesting configuration to the unified configuration server.

Preferably, the method for parameter configuration of a mobile terminal further includes that:

the mobile terminal feeds back a configuration result to the unified configuration server.

Preferably, the step that the operator database server configures the configuration information currently required by the mobile terminal includes that: the operator database server obtains, from an operator information database, the information of the operator in the environment where the mobile terminal currently is, and organizes the information of the operator into the configuration information according to a preset format.

Preferably, the trigger message contains the information of the operator, manufacturer information of the mobile terminal and the model of the mobile terminal.

The disclosure further provides a system for parameter configuration of a mobile terminal, including:

a mobile terminal configured to send a trigger message for requesting configuration to a unified configuration server; and further configured to receive and parse configuration information sent by an operator database server, and perform corresponding configuration on the mobile terminal according to the configuration information;

a unified configuration server configured to parse the trigger message to obtain information of an operator in an environment where the mobile terminal currently is and send the information of the operator to the operator database server;

an operator database server configured to configure, according to the information of the operator, configuration information currently required by the mobile terminal, and send the configuration information to the mobile terminal.

Preferably, the system for parameter configuration of a mobile terminal further includes:

a network determining module configured to determine, when the mobile terminal finds a new registered network through search, whether the new registered network is consistent with a network value stored by the mobile terminal.

Preferably, the system for parameter configuration of a mobile terminal further includes:

a configuration result feedback module configured to feed back a configuration result to the unified configuration server.

Preferably, the operator database server configuring the configuration information currently required by the mobile terminal includes that: the operator database server obtains, from an operator information database, the information of the operator in the environment where the mobile terminal currently is, and organizes the information of the operator into the configuration information according to a preset format.

Preferably, the trigger message contains the information of the operator, manufacturer information of the mobile terminal, and the model of the mobile terminal.

By the method of the disclosure, when a mobile terminal is in a region where some functions are not available, the mobile terminal can actively request a server to configure and modify client parameters, so as to achieve the beneficial effect that service software can always be used normally no matter which environment the mobile terminal is, thereby improving the user experience and normal life of users in the region.

The purpose implementation, function characteristics, and advantages of the disclosure will be further described in combination with the embodiments and with reference to the accompanying drawings.

DETAILED DESCRIPTION

The technical solution of the disclosure will be further described in combination with the accompanying drawings and embodiments in the specification. It should be understood that the embodiments described herein are only used for explaining the disclosure, instead of limiting the disclosure.

Figure 1:
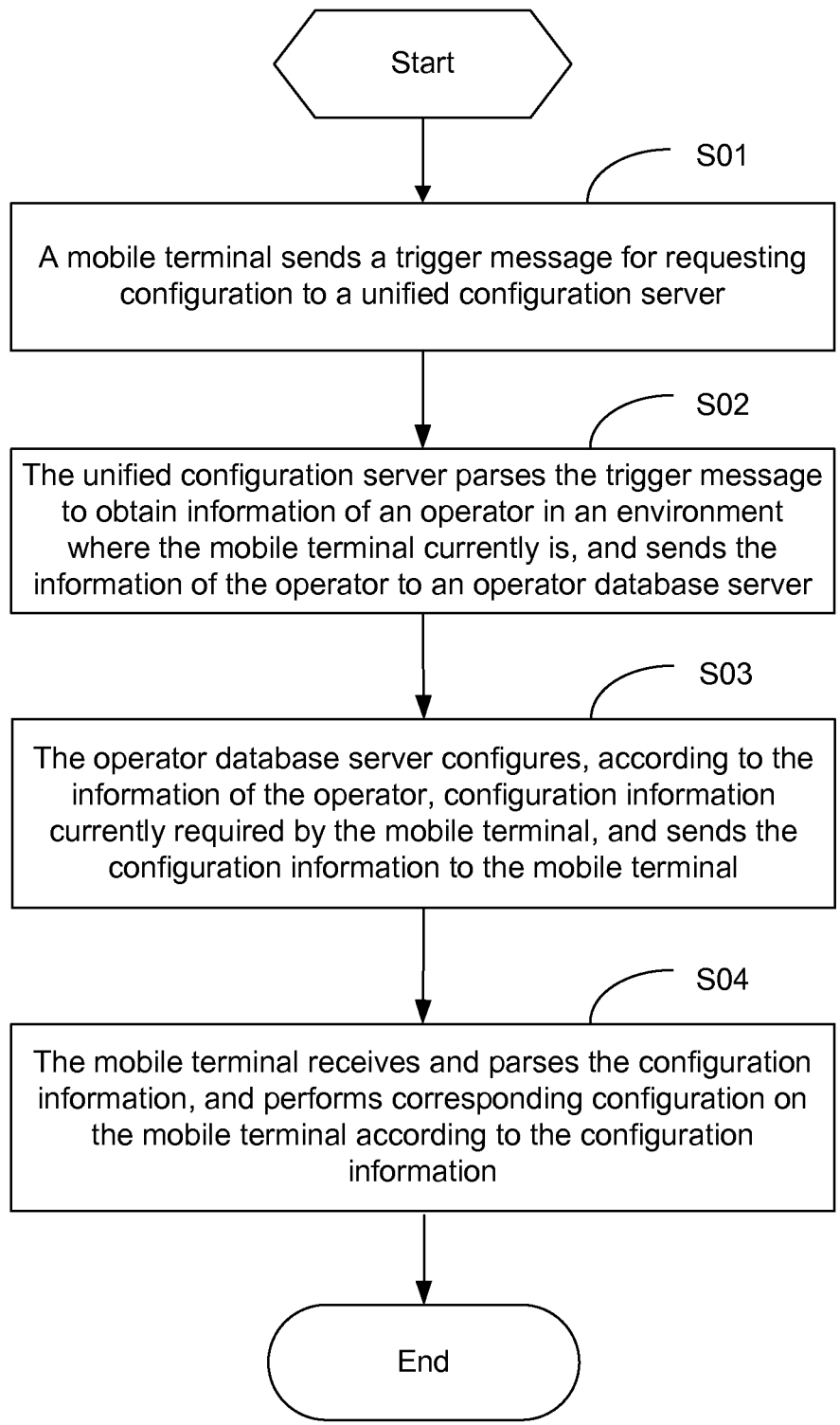
FIG. 1 is a flowchart of the first embodiment of a method for parameter configuration of a mobile terminal of the disclosure.

Referring to FIG. 1, FIG. 1 is a flowchart of the first embodiment of a method for parameter configuration of a mobile terminal of the disclosure. As shown in FIG. 1, the method for parameter configuration of a mobile terminal of the disclosure specifically includes the following steps:

Step S01: a mobile terminal sends a trigger message for requesting configuration to a unified configuration server;

the mobile terminal combines information, including the information of an operator in an environment where the mobile terminal currently locates, the manufacturer information of the mobile terminal and the model of the mobile terminal and etc., to form a special trigger message, and sends the trigger message to the unified configuration server; in a preferred embodiment, the format of the trigger message sent by the mobile terminal to the unified configuration server for requesting configuration is information of an operator/man/mod, wherein the information of the operator is mainly a network value corresponding to the operator, man indicates the manufacturer of the mobile terminal, and mod indicates the model of the terminal;

Step S02: the unified configuration server parses the trigger message to obtain the information of the operator in the environment where the mobile terminal currently locates, and sends the information of the operator to an operator database server;

after receiving the trigger message sent by the mobile terminal, the unified configuration server parses the trigger message, obtains from the mobile terminal a value of the operator in the environment where the mobile terminal currently is and transmits the value of the operator in the environment where the mobile terminal currently is to the operator database server;

Step S03: the operator database server configures, according to the information of the operator, configuration information currently required by the mobile terminal, and sends the configuration information to the mobile terminal;

the operator database server obtains configuration information of corresponding operator from an operator information database and organizes the obtained configuration information of corresponding operator into configuration information according to a preset format and sends the configuration information to the mobile terminal; in a preferred embodiment, the preset format may be a user-defined format, and may be also OMA CP;

Step S04: the mobile terminal receives and parses the configuration information, and performs corresponding configuration on the mobile terminal according to the configuration information.

After receiving the configuration information sent by the operator database server, the mobile terminal parses the configuration information and performs corresponding configuration according to the configuration information and a parsing result.

In the method for parameter configuration of a mobile terminal of the embodiment, a mobile terminal actively requests a server to configure and modify client parameters, so as to achieve the beneficial effect that service software can always be used normally no matter which environment the mobile terminal is in, thereby improving the user experience.

Figure 2:
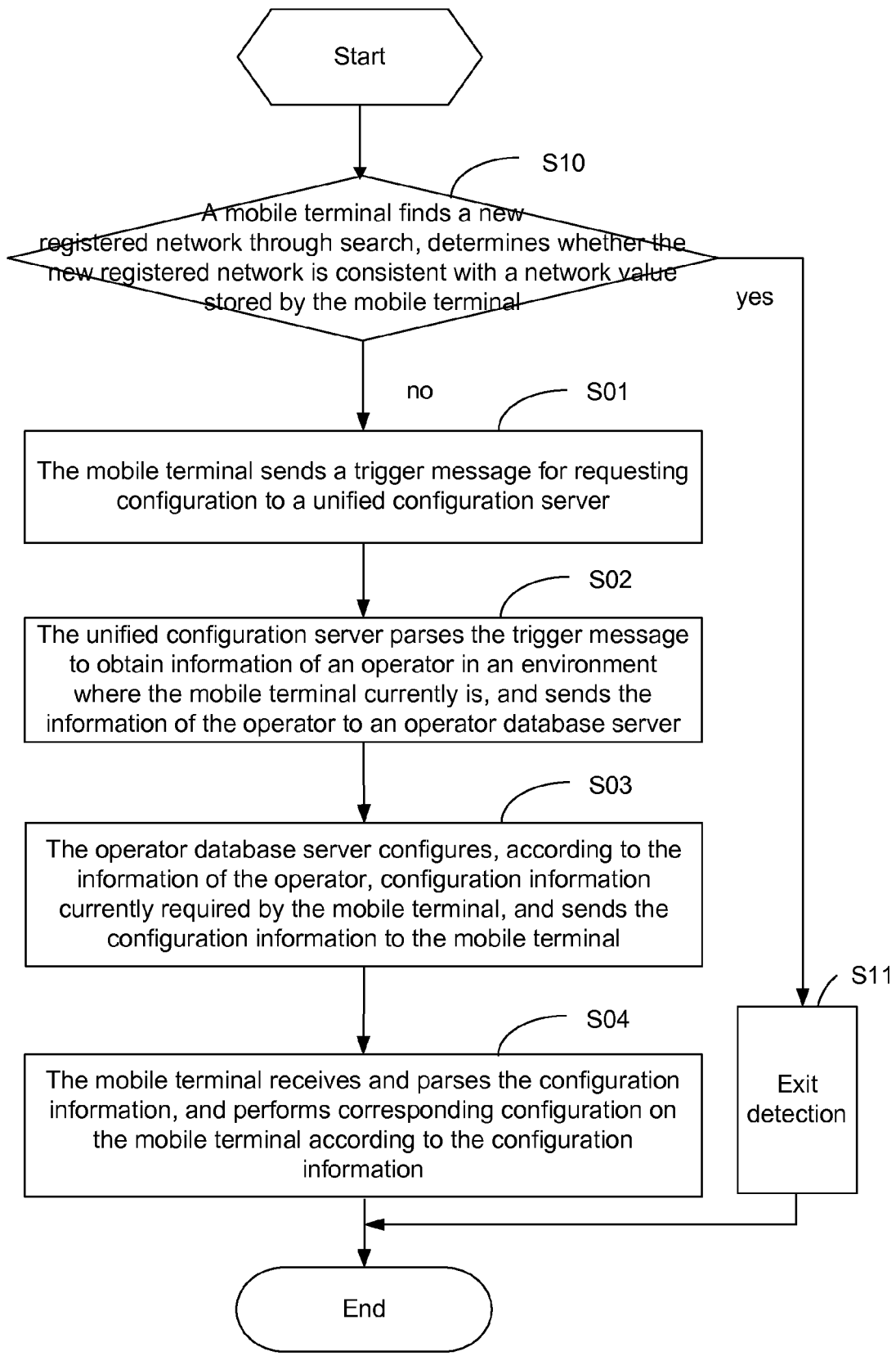
FIG. 2 is a flowchart of the second embodiment of a method for parameter configuration of a mobile terminal of the disclosure.

Referring to FIG. 2, FIG. 2 is a flowchart of the second embodiment of a method for parameter configuration of a mobile terminal of the disclosure. As shown in FIG. 2, before Step S01 in which the mobile terminal sends the trigger message for requesting configuration to the unified configuration server, the method for parameter configuration of a mobile terminal of the disclosure further includes the following steps:

Step S10: the mobile terminal finds a new registered network through search, determines whether the new registered network is consistent with a network value stored by the mobile terminal; if not consistent, Step S01 is executed and the mobile terminal sends the unified configuration server the trigger message for requesting configuration; if consistent, Step S11 is then executed;

Step S11: detection is stopped.

When detecting that the network operator with which the mobile terminal currently registers has changed, the mobile terminal compares current new registered network with the network value stored previously; if they are inconsistent, the mobile terminal triggers a configuration process actively, and sends the trigger message for requesting configuration to the unified configuration server; if the current new registered network and the network value stored previously are consistent, the mobile terminal is used normally according to the network value stored previously and detection is stopped.

In the method for parameter configuration of a mobile terminal of the embodiment, when a mobile terminal is in a region where some functions are not available, the mobile terminal actively requests a server to configure and modify client parameters, so as to achieve the beneficial effect that service software can always be used normally no matter which environment the mobile terminal is in, thereby improving the user experience and normal life of users in this region.

Figure 3:
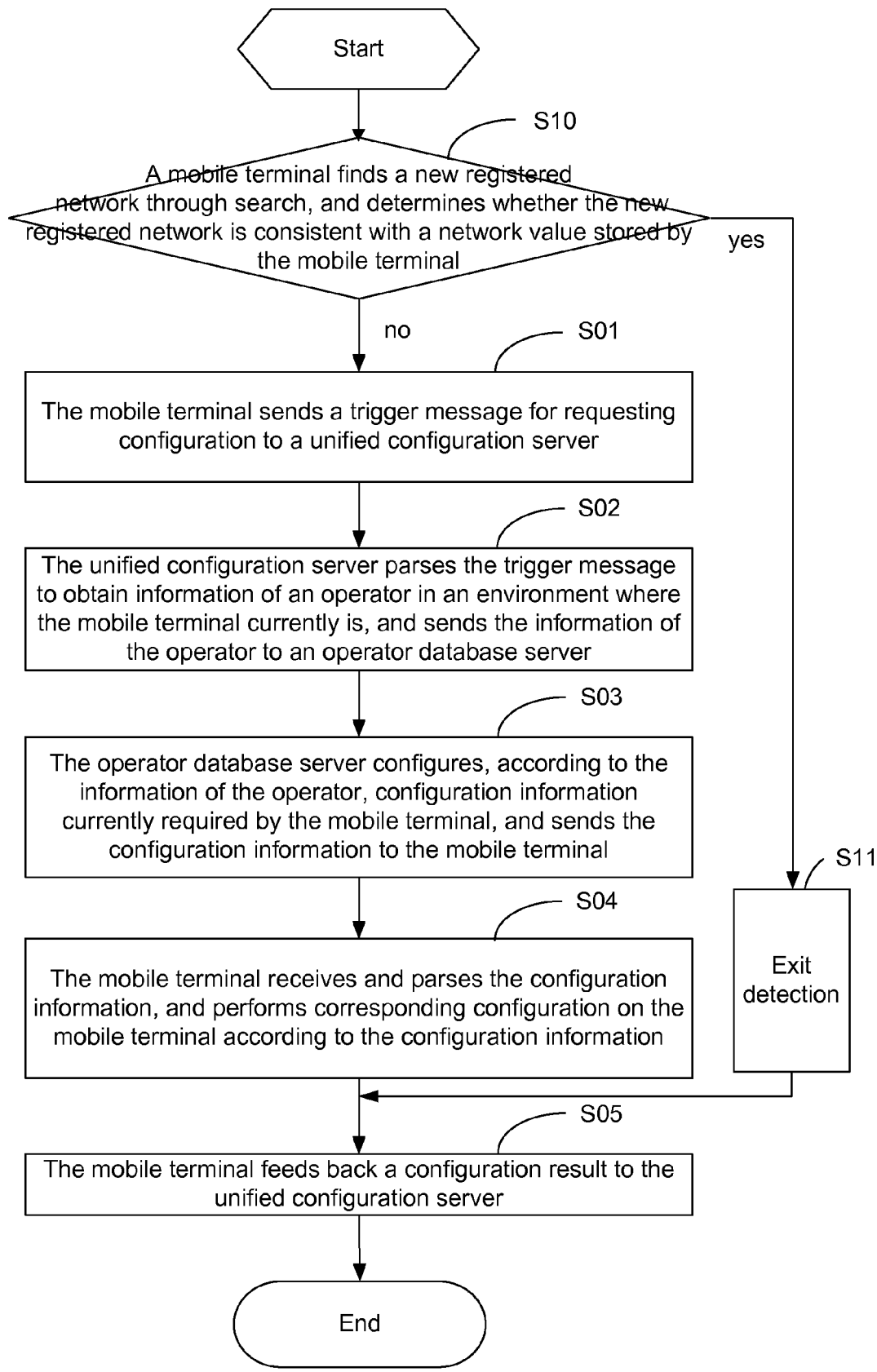
FIG. 3 is a flowchart of the third embodiment of a method for parameter configuration of a mobile terminal of the disclosure.

Referring to FIG. 3, FIG. 3 is a flowchart of the third embodiment of a method for parameter configuration of a mobile terminal of the disclosure. As shown in FIG. 3, after Step S04 in which the mobile terminal receives and parses the configuration information, and performs corresponding configuration on the mobile terminal according to the configuration information, the method for parameter configuration of a mobile terminal of the disclosure further includes the following step:

Step S05: the mobile terminal feeds back a configuration result to the unified configuration server.

When finishing configuration, the mobile terminal connects back to the unified configuration server according to the new configuration information transmitted by the operator database server, detects a configuration result and feeds back the configuration result to the unified configuration server to compete a reporting process.

In the method for parameter configuration of a mobile terminal of the embodiment, when a mobile terminal is in a region where some functions are not available, the mobile terminal actively requests a server to configure and modify client parameters and feeds back the configuration result to the server, so as to achieve the beneficial effect that service software can always be used normally no matter which environment the mobile terminal is in, thereby improving the user experience and normal life of users in the region. Also, the technical solution is more complete and more humanized.

Figure 4:
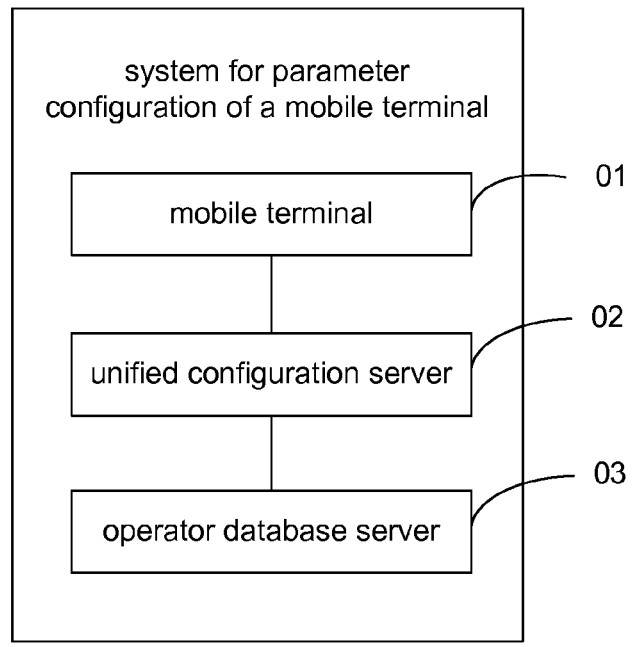
FIG. 4 is a structural diagram of the first embodiment of a system for parameter configuration of a mobile terminal of the disclosure.

Referring to FIG. 4, FIG. 4 is a structural diagram of the first embodiment of a system for parameter configuration of a mobile terminal of the disclosure. As shown in FIG. 4, the system for parameter configuration of a mobile terminal of the disclosure includes:

a mobile terminal 01 configured to send a trigger message for requesting configuration to a unified configuration server; and further configured to receive and parse configuration information sent by an operator database server, and perform corresponding configuration on the mobile terminal according to the configuration information;

the mobile terminal 01 combines information, including information of an operator in an environment where the mobile terminal is, manufacturer information of the mobile terminal and the model of the mobile terminal and etc., to form a special trigger message, and sends the special trigger message to a unified configuration server 02; in a preferred embodiment, the format of the trigger message sent by the mobile terminal 01 to the unified configuration server 02 for requesting configuration is information of an operator/man/mod, wherein the information of the operator is mainly a network value corresponding to the operator, man indicates the manufacturer of the mobile terminal and mod indicates the model of the terminal; after receiving the configuration information sent by the operator database server 03, the mobile terminal 01 parses the configuration information and performs corresponding configuration on the terminal according to the configuration information and a parsing result;

a unified configuration server 02 configured to parse the trigger message to obtain the information of the operator in the environment where the mobile terminal currently is and send the information of the operator to the operator database server;

after receiving the trigger message sent by the mobile terminal 01, the unified configuration server 02 parses the trigger message, obtains from the mobile terminal a value of the operator in the environment where the mobile terminal currently is and transmits the value of the operator in the environment where the mobile terminal 01 currently is to the operator database server 03;

an operator database server 03 configured to configure, according to the information of the operator, configuration information currently required by the mobile terminal, and send the configuration information to the mobile terminal.

The operator database server 03 obtains configuration information of corresponding operator from an operator information database, organizes the obtained configuration information of the corresponding operator into configuration information according to a preset format and sends the configuration information to the mobile terminal 01; in a preferred embodiment, the preset format may be a user-defined format, or may be OMA CP.

In the system for parameter configuration of a mobile terminal of the embodiment, the mobile terminal actively requests the server to configure and modify client parameters, so as to achieve the beneficial effect that service software can always be used normally no matter which environment the mobile terminal is in, thereby improving the user experience.

Figure 5:
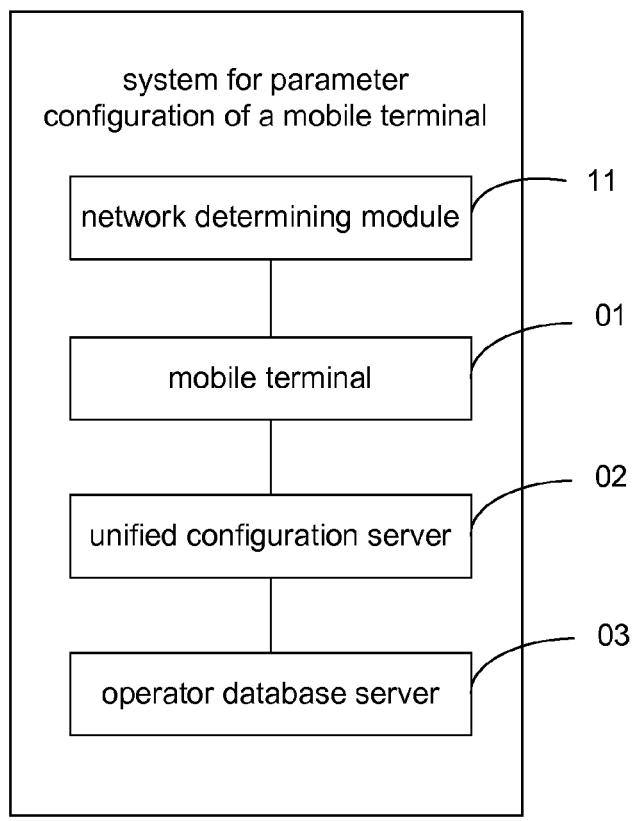
FIG. 5 is a structural diagram of the second embodiment of a system for parameter configuration of a mobile terminal of the disclosure.

Referring to FIG. 5, FIG. 5 is a structural diagram of the second embodiment of a system for parameter configuration of a mobile terminal of the disclosure. As shown in FIG. 5, the system for parameter configuration of a mobile terminal of the disclosure further includes:

a network determining module 11 configured to determine, when the mobile terminal finds a new registered network through search, whether the new registered network is consistent with a network value stored by the mobile terminal.

When detecting that the network operator with which the mobile terminal currently registers has changed, the network determining module 11 compares current new registered network with the network value stored previously; if they are inconsistent, the network determining module 11 triggers a configuration process actively, and sends the trigger message for requesting configuration to the unified configuration server 02; if the current new registered network and the network value stored previously are consistent, the mobile terminal is used normally according to the network value stored previously and detection is stopped.

In the system for parameter configuration of a mobile terminal of the embodiment, when a mobile terminal is in a region where some functions are not available, the mobile terminal actively requests a server to configure and modify client parameters, so as to achieve the beneficial effect that service software can always be used normally no matter which environment the mobile terminal locates, thereby improving the user experience and normal life of users in the region.

Figure 6:
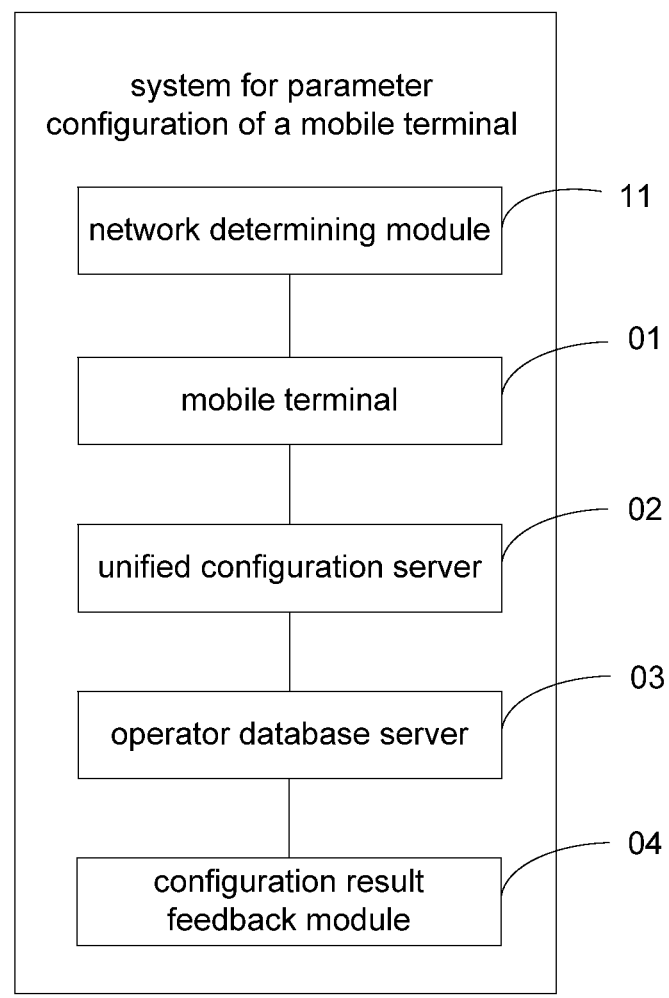
FIG. 6 is a structural diagram of the third embodiment of a system for parameter configuration of a mobile terminal of the disclosure.

Referring to FIG. 6, FIG. 6 is a structural diagram of the third embodiment of a system for parameter configuration of a mobile terminal of the disclosure. The system for parameter configuration of a mobile terminal of the disclosure further includes:

a configuration result feedback module 04 configured to feed back a configuration result to the unified configuration server.

After the mobile terminal finishes configuration, the configuration result feedback module connects back to the unified configuration server 02 according to the new configuration information transmitted by the operator database server 03, detects a configuration result and feeds back the configuration result to the unified configuration server 02 to compete a reporting process.

By means of the device for parameter configuration of a mobile terminal of the embodiment, when a mobile terminal is in a region where some functions are not available, the mobile terminal actively requests a server to configure and modify client parameters and feeds back a configuration result to the server, so as to achieve the beneficial effect that service software can always be used normally no matter which environment the mobile terminal is, thereby improving the user experience and normal life of users in the region. Also, the technical solution is more complete and more humanized.

What are described above are only preferred embodiments of the disclosure, which cannot limit the patent scope of the disclosure. All equivalent structures or equivalent flow modifications made within contents of the specification and the accompanying drawings of the disclosure, or direct or indirect application in other related technical fields all shall be included in the patent protection scope of the disclosure.

What is claimed is:

1. A method for parameter configuration of a mobile terminal, comprising:
    finding, by a mobile terminal, a new registered network through search, determining whether the new registered network is consistent with a network value stored by the mobile terminal; and if not consistent, sending, by the mobile terminal, a trigger message for requesting configuration to a unified configuration server;
    sending, by the mobile terminal, the trigger message for requesting configuration to the unified configuration server;
    parsing, by the unified configuration server, the trigger message, to obtain information of an operator in an environment where the mobile terminal currently is, and sending the information of the operator to an operator database server;
    configuring, by the operator database server, configuration information currently required by the mobile terminal according to the information of the operator, and sending the configuration information to the mobile terminal; and
    receiving and parsing, by the mobile terminal, the configuration information, and performing corresponding configuration on the mobile terminal according to the configuration information.

2. The method for parameter configuration of a mobile terminal according to claim 1, further comprising:
    feeding back, by the mobile terminal, a configuration result to the unified configuration server.

3. The method for parameter configuration of a mobile terminal according to claim 1, wherein configuring, by the operator database server, the configuration information currently required by the mobile terminal comprises: obtaining, by the operator database server, the information of the operator in the environment where the mobile terminal currently is from an operator information database, and organizing the information of the operator into the configuration information according to a preset format.

4. The method for parameter configuration of a mobile terminal according to claim 3, wherein the trigger message contains the information of the operator, manufacturer information of the mobile terminal, and model of the mobile terminal.

5. The method for parameter configuration of a mobile terminal according to claim 1, wherein the trigger message contains the information of the operator, manufacturer information of the mobile terminal, and model of the mobile terminal.

6. A system for parameter configuration of a mobile terminal, comprising:
    a mobile terminal configured to send a trigger message for requesting configuration to a unified configuration server; and further configured to receive and parse configuration information sent by an operator database server, and perform corresponding configuration on the mobile terminal according to the configuration information;
    a unified configuration server configured to parse the trigger message to obtain information of an operator in an environment where the mobile terminal currently is and send the information of the operator to the operator database server;
    the operator database server configured to configure, according to the information of the operator, configuration information currently required by the mobile terminal, and send the configuration information to the mobile terminal; and
    a network determining module configured to determine, when the mobile terminal finds a new registered network through search, whether the new registered network is consistent with a network value stored by the mobile terminal.

7. The system for parameter configuration of a mobile terminal according to claim 6, further comprising:
    a configuration result feedback module configured to feed back a configuration result to the unified configuration server.

8. The system for parameter configuration of a mobile terminal according to claim 6, wherein the operator database server configuring the configuration information currently required by the mobile terminal comprises that: the operator database server obtains, from an operator information database, the information of the operator in the environment where the mobile terminal currently is, and organizes the information of the operator into the configuration information according to a preset format.

9. The system for parameter configuration of a mobile terminal according to claim 8, wherein the trigger message contains the information of the operator, manufacturer information of the mobile terminal and model of the mobile terminal.

10. The system for parameter configuration of a mobile terminal according to claim 6, wherein the trigger message contains the information of the operator, manufacturer information of the mobile terminal and model of the mobile terminal.

\* \* \* \* \*